Nov. 17, 1953  N. E. ANDERSON  2,659,796
ELECTRIC WELDING APPARATUS
Filed Feb. 5, 1951  2 Sheets-Sheet 1
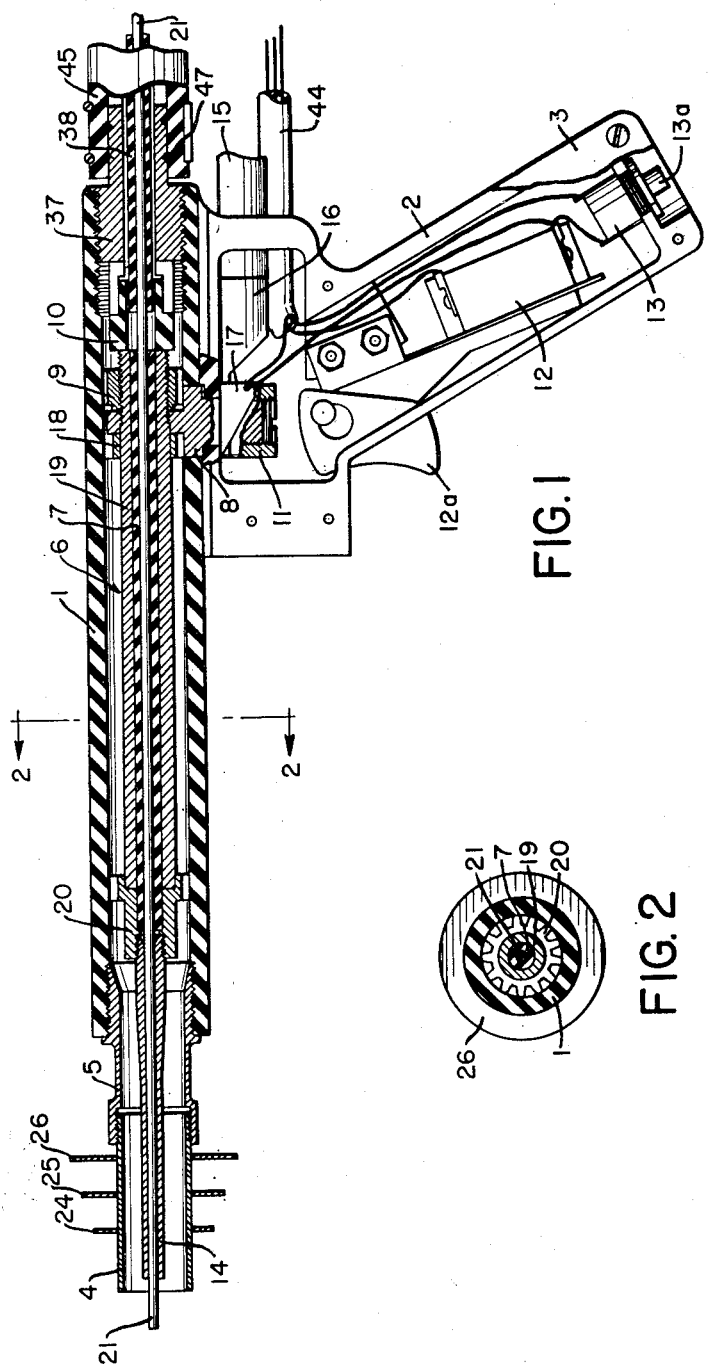
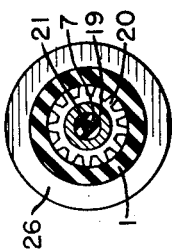
INVENTOR
NELSON E. ANDERSON
ATTORNEY Nov. 17, 1953
N. E. ANDERSON
2,659,796
ELECTRIC WELDING APPARATUS
Filed Feb. 5, 1951
2 Sheets-Sheet 2
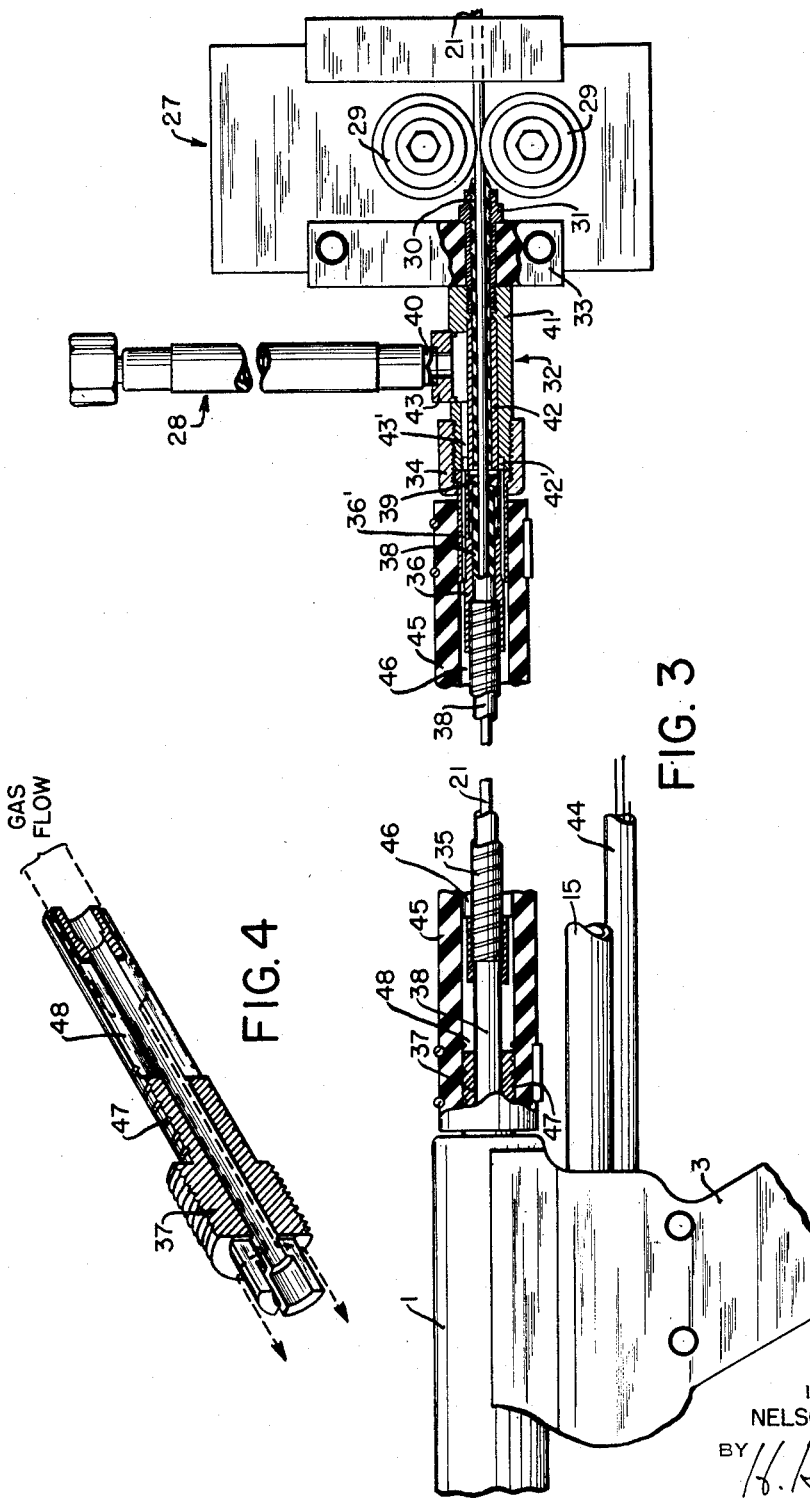
INVENTOR
NELSON E. ANDERSON
BY
ATTORNEY Patented Nov. 17, 1953

2,659,796

UNITED STATES PATENT OFFICE 2,659,796

ELECTRIC WELDING APPARATUS

Nelson E. Anderson, Berkeley Heights, N. J., assignor to Air Reduction Company, Incorporated, New York, N. Y., a corporation of New York Application February 5, 1951, Serial No. 209,430

6 Claims. (Cl. 219—8)

This invention relates to gas shielded metal arc welding apparatus. Patent Number 2,504,868, issued April 18, 1950, to Albert Muller et al. and assigned to the same assignee as the present application, discloses a gas shielded metal arc welding method in which a bare consuming wire electrode is fed to a welding arc within an envelope of shielding gas. In the preferred form of that invention the shielding gas is a monatomic inert gas. The electrode wire and work are usually of substantially identical composition and may be any weldable metal or alloy, ferrous or non-ferrous. In the practice of this invention, the welding currents employed may be relatively high, being of the order of 200 to 350 amperes on wires of $\frac{1}{3}$ inch diameter. The wire is fed to the arc at the wire burn off rate to maintain equilibrium in the arc, which feed rate may be of the order of 150 to 300 inches per minute. This relatively high wire feed rate, coupled with the requirement for introducing high value welding currents into the rapidly moving wire, presents wire feeding and current contact problems.

It has been found, for instance, that in many applications of this gas shielded, bare wire metal arc welding process, the wire electrode must be physically and chemically clean in order to obtain sound weld deposits. This is disclosed in a co-pending application by Albert Muller, Serial No. 159,051, filed April 29, 1950, and assigned to the same assignee as the present application. This makes it impossible to use lubricants of any kind on the wire, which increases the difficulty with which the wire may be fed through the apparatus. This difficulty is multiplied where the wire is pushed through a substantial length of flexible casing to a portable welding gun for manual welding operations, inasmuch as such operations produce a constantly changing amount of bending of the casing with consequent variations in resistance to feeding. It is further multiplied where the wire is aluminum or a similar soft metal which, when clean, will cold weld or gall in the apparatus as it is being fed, thereby jamming the device. The term "gall" as used herein, refers to that phenomenon in which surface metal of one member is actually bonded to a second member with which it is in contact by a cold formed molecular bond of sufficient tenacity to remove surface metal from the first member as the first member passes in intimate contact with the second member.

It has also been found necessary to control the point at which the welding current is introduced into the wire within the apparatus. There are two important reasons for this. One reason is that substantial heat is developed at the point where the current is transferred to the electrode wire because of contact resistance. For purposes of safety and long trouble-free apparatus life, it is essential that this effect be minimized and localized. A second equally or more important reason is that the length of electrode wire carrying the welding current is very important to the welding process and the results it produces. It is extremely important that this length (from point of current introduction into the wire to the arcing end) be kept (1) constant and (2) short. The reason for this is that when the current density in the electrode is relatively high there is a large amount of resistance heating of the portion of the wire through which the welding current flows. This is effectively a high intensity preheat of the wire which affects the electrode burn-off rate and the welding energy distribution. In order to obtain consistent and uniform welds, this resistance heating must be maintained constant. For best results this resistance heating must also be as small as possible. This is accomplished by introducing the current to the wire as near the arc as practical and by preventing current introduction to the wire at any but the preselected location.

It is, therefore, an object of this invention to provide gas shielded consumable electrode arc welding apparatus through which clean bare electrode wire may be fed without excessive friction and without galling.

Another object is to provide gas shielded consumable electrode arc welding apparatus within which the welding current is introduced into the electrode wire only at a preselected location within the apparatus.

Another object is to provide a flexible casing through which chemically clean bare wire may be continuously fed without causing chatter within the casing, and in which no galling of the wire will occur. These and other objects, which will become apparent from the following specification, are achieved by providing apparatus having certain novel lining elements arranged and supported in a novel manner as exemplified by the accompanying drawings.

Figure 1 is a longitudinal sectional view through a manual welding gun forming a portion of the present invention.

Figure 2 is a transverse section of the gun taken at 2—2 of Figure 1.

Figure 3 is a longitudinal sectional view partially broken away of the casing assembly connecting the gun of Figure 1 with the wire feed roll unit and the shielding gas supply.

Figure 4 is a sectional perspective view of the casing gun-end fitting, illustrating more clearly the details of its construction, and the manner in which gas flows through the fitting.

The gun proper (Figure 1) consists of an outer barrel 1, a handle 2, and a handle cover 3, all of thermal and electrical insulating material, a gas nozzle 4 and gas nozzle adapter 5, an inner barrel assembly 6, a barrel assembly insulating liner 7, an annular head type of stud 8, an assembly nut 9, an insulating bushing 10, a stud nut 11, a trigger switch 12, operated by a trigger 12a, a jog switch 13, operated by pushbutton 13a, and a contact tube 14.

Welding current, carried to the gun by an insulated welding cable 15 which is soldered into lug 16, is transferred to the stud 8 and lug 17 through the stud nut 11 which rides against the tongue of lug 16. One face of stud 8, rests against a shoulder of the inner barrel assembly 6 which is formed by pinion 18 having an axial hole therein so it can be fitted over and soldered to an inner barrel member 19. Nut 9 is threaded on the end of the inner barrel, member 19 of inner panel assembly 6, so that the latter is held securely in place. Stud 8, stud nut 11, inner barrel 19, pinion 18 and nut 9 are all made of materials that are good electrical and thermal conductors, such as copper and brass. A sleeve 20 is soldered to the forward end of inner barrel 19. This sleeve serves as a gas flow control element and simultaneously maintains the inner barrel assembly concentrically located within the outer barrel. It is made out of steel pinion wire and has a through hole for the wire, a counterbore to seat insulating liner 7, a larger counterbore to seat inner barrel 19 and a tapped hole to receive contact tube 14, all holes being concentric. The spaces between the teeth of the pinion wire form a series of longitudinally directed and concentrically arranged gas ports which assist in the formation of the proper gas flow pattern for adequate gas shielding of the weld. After the inner barrel assembly has been soldered, sleeve 20 is preferably silver plated to increase the electrical and thermal contact conductivity and prevent corrosion. While inner barrel assembly 6 and insulating liner 7 are applicable for all sizes of wire within the operating capacity of the gun, contact tube 14 must be changed for different sizes of wire. The hole in contact tube 14 is usually only a few thousandths of an inch larger than the diameter of the wire electrode 21 to assure adequate electrical contact between the contact tube and the wire. The current is transferred to contact tube 14 through the threads in sleeve 20. The internal diameter of the contact tube should not exceed the wire diameter plus 20% and this internal diameter should be maintained for a length of at least 25 times the internal diameter for best operation.

Insulating barrel 1 is tapped at both ends. At the rear end it receives a casing assembly gun-end end fitting 37 and at the forward end it receives the gas nozzle adapter 5. Gas nozzle 4 is preferably made with radiating fins, such as the three concentric fins 24, 25, and 26, which increase in diameter in a direction away from the welding area. The nozzle 4 and the fins 24, 25 and 26, are made of good heat conductors such as copper. The concentric fins give a large surface area to radiate the heat and prevent overheating of the nozzle. Gas nozzle adapter 5, into which gas nozzle assembly 4 screws, is made of a very poor heat conductor, such as stainless steel, and is machined to have a very thin section to increase its resistance to heat transfer in order to protect the end of outer barrel 1 from extreme high temperatures. Nozzle 4 and adapter 5 and the outer barrel 1 preferably cooperate to form an unobstructed gas flow passage free of severe changes in cross sectional area and free of severe changes of gas flow direction for an axial distance of at least five times the nozzle orifice diameter.

The casing (Figure 3) is a completely insulated assembly in which the wire is conveyed from a drive roll assembly 27 to the gun. After the wire has been pulled, by power driven rolls 29, from a reel or other source of supply (not shown) it enters connector insert 30 which is made of nylon. Insert 30 is threaded into and seats on a shoulder in connector insert nut 31 and which protrudes therefrom into gas connection assembly 32. Connector insert nut 31 has an external hexagonal shoulder which rests against one side of an adjustment block 33. The end of connector insert nut 31, which protrudes from the other side of block 33, is threaded and screws into gas connection assembly 32 thus locking connector insert 30, connector insert nut 31 and gas supply fitting 28 in place with respect to the adjustment block 33. The downstream end of gas connection soldering assembly 32 has an external thread to which the flexible portion of the casing is connected by a union nut 34. The flexible portion of the casing includes a flexible hollow metal casing 35 soldered into a feed-roll-end fitting 36 and a gun-end fitting 37. The feed-roll-end fitting 36 is counterbored to receive a nylon liner assembly, consisting of a nylon liner 38 and a nylon plug 39. Liner 38 and plug 39 are permanently bonded together as a sub-assembly. The end face of fitting 36 butts against the end face of the gas connection assembly 32 when nut 34 is tightened over the flanged end of end fitting 36. End fitting 36 has a series of concentrically arranged longitudinal holes 36' drilled through it to pass the shielding gas, as will be more fully disclosed hereinafter. Nylon liner 38 extends through gun-end fitting 37 and into bushing 10, which seats in the counterbore of end fitting 37. Thus the wire is insulated from its carrier tubes until it enters contact tube 14. Nylon liner 38 does not butt against insulating liner 7. The nylon liner 38 is made a free fit in bushing 10. Free end play is allowed to accommodate the dimensional instability of the nylon liner and to increase the flexibility of the casing. Motion of the wire produces tension in the nylon liner 38 causing it to elongate in a downstream direction and were it not for the fact that it is supported only at the upstream end, with room downstream for expansion, the liner would buckle and obstruct the free feeding of wire through it, resulting in chattering and/or jamming. Different sizes of wire may require different connector inserts 30, nylon liners 38, nylon plugs 39, flexible casings 35, gun-end fittings 37, feed-roll-end fittings 36, and bushings 10. Where the wire passes from one piece to the next, the hole in the new piece must either be greater in diameter than the first piece or have an entering taper to keep the wire from "hanging up."

Shielding gas is introduced into the casing immediately downstream of the drive roll assembly through the gas supply fitting 28 and flows into the gun through end fitting 37. Gas connection assembly 32 consists of gland 40, connector barrel 41, tube 42 and gas fitting 43. The connector barrel 41 is tapped at the rear end to receive connector insert nut 31. It is counterbored from the other end to receive tube 42, which is soldered in place. A larger diameter counterbore forms an annular space 42' around the tube. There is a transverse hole half way through barrel 41 for the gas fitting 43. A series of small holes 43' is drilled in gas connector barrel 41 joining the annular space 42' and the hole for the gas fitting. The gas fitting 43 has a radius cut on it so that gas may flow through the gland 40 (which is soldered into the gas fitting 43), through gas fitting 43, and then through the series of holes 43' into the annular space 42' of gas connector barrel 41. The feed-roll-end fitting 36 lies along the same axis as the gas connector assembly 32. The series of holes 36' drilled in the feed-roll-end fitting 36 are drilled on the same radius as the holes 43' and allow the gas to flow into the space 46 between the casing 35 and a hose 45. The hose 45 is clamped to the end fittings 36 and 37. The gun-end fitting 37 has circumferential V grooves 37' to provide a positive gripping surface for seating and clamping the hose. The gun-end fitting has longitudinal slots 48 that break through to the central hole to provide gas passages. The manner in which the gas passes through this portion of the apparatus is best seen in Figure 4. This end fitting 37 screws into outer barrel 1. Grooves in nut 9 and clearance around stud 8 permit the gas to pass through the barrel. Gas passes to the welding area through the spaces between the teeth of stud 18 and sleeve 20.

Control wires for trigger switch 12 and jog switch 13 are brought in by three-conductor cable 44.

Thus it may be seen that a continuous bare wire metal arc welding tool has been devised that overcomes the problems of wire feeding and current transfer. The wire is fed through this device all the way from the power driven feed rolls to the contact tube within a non-galling low-friction insulating structure, free of metal to metal contact. For all portable welding apparatus of this type, and especially for manual apparatus as fully disclosed herein, the casing must be light and flexible. The wire must be able to feed through it equally well whether the casing be drawn taut or hanging or lying in loops or fair curves. This makes the choice of casing liner material critical. It must present a relatively low coefficient of friction when used without a lubricant, it must be flexible, it must be electrically non-conducting, it must resist wear and abrasion, and it must be of such a nature as not to cause galling with chemically clean wire, particularly with wires of metals like aluminum or magnesium. One such suitable liner material is nylon, a now well-known synthetic polymer. Polyhexamethylene adipamide, which is known commercially as FM 10,001 nylon, is a particularly good liner material having all the required properties. The selection of nylon as a lining material represents a distinct advance in apparatus of this type. A still further advance, however, is affected by supporting this liner in tension. This mode of support eliminates the tendency of the liner to buckle and chatter within the casing.

The rigid non-metallic insulating members through which the wire is fed may be made of nylon, as above, but may also be made of other tough, low-friction plastics, such as a fibre glass reinforced thermosetting melamine resin. Insulating liner 7 in the gun is such a member.

In addition to reducing the mechanical resistance to feeding to a minimum, the entire passage of the wire through these insulating materials eliminates the possibility of electrical contact, and therefore the transfer of current to the wire anywhere but at the desired location; namely within the contact tube 14. This prevents pitting of the wire and gun and casing elements due to arcing therein. Such pitting, if present, greatly impedes the free feeding of the wire through the apparatus. This insulating feature also controls and minimizes resistance heating within the welding wire.

The copper gas nozzle 23 and the stainless steel adapter 5 are electrically floating inasmuch as they are screwed into the insulating outer barrel 1. This eliminates any possibility of arcing to the nozzle or adapter from the wire or contact tube or from the nozzle or adapter to the work when the gun is laid down on, or brushed against, the work. The gun is fully insulated for the operator's safety.

While the preferred embodiment of the invention has been disclosed herein, it is understood that certain modifications may be made without departing from the spirit of the invention as defined by the following claims.

I claim:

1. A flexible casing for the continuous passage therethrough of chemically clean bare wire comprising a flexible metal conduit and a liner of flexible non-galling tubing, said liner of flexible tubing being longitudinally supported within said flexible metal conduit only at the end through which said wire enters to form an assembly in which a free space is provided at the unsupported wire discharge end of said liner to accommodate the dimensional instability of said liner as it is placed in tension by the frictional forces exerted on said liner by said wire passing therethrough.

2. A flexible casing for the continuous passage therethrough of chemically clean bare wire comprising a flexible metal conduit and a liner of flexible nylon tubing, said liner of flexible nylon tubing being longitudinally supported within said flexible metal conduit only at the end through which said wire enters, to form an assembly in which a free space is provided at the wire discharge end of said liner to accommodate the dimensional instability of said nylon liner as it is placed in tension by the frictional forces exerted on said liner by said wire passing therethrough.

3. Welding apparatus comprising power driven wire feed rolls, a flexible casing into which wire is delivered by said feed rolls, and a welding gun into which wire is delivered by said casing, said casing comprising a flexible metal conduit, a flexible nylon liner within said conduit, means acting at the feed roll end of said casing for longitudinally supporting said liner within said conduit while the gun end of said liner remains longitudinally unsupported to place said liner in tension by the frictional forces exerted on said liner by the passage of wire therethrough, and low-friction electrically non-conducting lining means within said gun to isolate said electrode wire from all other conducting members except a current contact member located at a preselected point within the gun.

4. In inert gas shielded depositing electrode metal arc welding apparatus comprising a welding gun containing an inner wire guide assembly, a welding current contact member, a surrounding outer gas-conducting and shield-forming assembly, means for supplying shielding gas to said gas-conducting and shield-forming assembly, a flexible casing connected to the rear end of said gun and adapted to conduct welding wire to said gun, and power driven wire feed means for continuously supplying welding wire to said casing, the improvement which comprises providing the flexible casing and welding gun wire guide portion with non-galling and electrically non-conducting liners, said flexible casing liner being nylon and being longitudinally supported at the wire entrance end of said casing only, and having a free space provided at the gun end of said liner for its unrestrained longitudinal expansion and contraction.

5. In inert gas shielded depositing electrode metal arc welding apparatus comprising a welding gun containing an inner wire guide assembly, a welding current contact member, a surrounding outer gas-conducting and shield-forming assembly, means for supplying shielding gas to said gas-conducting and shield-forming assembly, a flexible casing connected to the rear end of said gun and adapted to conduct welding wire to said gun, and power driven wire feed means for continuously supplying welding wire to said casing, the improvement which comprises providing the flexible casing and welding gun wire guide portion with non-galling and electrically non-conducting liners, said flexible non-galling and electrically non-conducting casing liner being longitudinally supported at the wire entrance end only, and having a free space provided at the gun end of said liner for its unrestrained longitudinal expansion and contraction.

6. Gas shielded arc welding apparatus for use with long lengths of chemically clean flexible aluminum electrode wire comprising a manual gun containing an inner wire guide assembly having a surface in contact with said wire of a non-galling electrically non-conducting material, a welding current contact member nearer the welding arc than said wire guide assembly, a surrounding outer gas conducting and shield forming assembly, a flexible casing assembly of fixed length connected to the rear end of said gun to convey aluminum welding wire to said gun, said casing having an internal surface of nylon in contact with said wire, and power driven wire feed means at the end of the flexible casing remote from said gun for continuously and uniformly pushing said aluminum electrode wire through said casing, said wire guide and said contact element to the welding arc.

NELSON E. ANDERSON.

References Cited in the file of this patent
UNITED STATES PATENTS

| Number | Name | Date |
|---|---|---|
| 2,246,086 | Austin | June 17, 1941 |
| 2,504,868 | Muller et al. | Apr. 18, 1950 |